United States Patent
Strohmaier et al.

(10) Patent No.: US 6,924,382 B2
(45) Date of Patent: Aug. 2, 2005

(54) RUMEN BYPASS CALCIUM SALTS OF C18:1 AND C18:2 FATTY ACIDS

(75) Inventors: George K. Strohmaier, Medina, OH (US); Eiler D. Frederiksen, Henderson, NV (US); Nestor D. Luchini, Naperville, IL (US)

(73) Assignee: NuSci Laboratories LLC, Fairlawn, OH (US)

( * ) Notice: Subject to any disclaimer, the term of this patent is extended or adjusted under 35 U.S.C. 154(b) by 0 days.

(21) Appl. No.: 10/431,318

(22) Filed: May 6, 2003

(65) Prior Publication Data

US 2004/0224070 A1 Nov. 11, 2004

(51) Int. Cl.$^7$ ............................................. C07C 51/00
(52) U.S. Cl. ...................... 554/156; 426/807; 514/558
(58) Field of Search .................. 554/156; 426/807; 514/558

(56) References Cited

U.S. PATENT DOCUMENTS

| | | | |
|---|---|---|---|
| 4,642,317 A | 2/1987 | Palmquist et al. | 514/558 |
| 4,826,694 A | 5/1989 | McAskie | 426/74 |
| 4,853,233 A | 8/1989 | McAskie | 426/74 |
| 4,909,138 A | 3/1990 | McAskie | 99/536 |
| 5,004,728 A | 4/1991 | Chalupa et al. | 514/12 |
| 5,143,737 A | 9/1992 | Richardson | 426/2 |
| 5,250,307 A | 10/1993 | Cummings et al. | 426/72 |
| 5,416,115 A | 5/1995 | Erdman et al. | 514/560 |
| 6,521,249 B2 | 2/2003 | Block et al. | 424/442 |

FOREIGN PATENT DOCUMENTS

| | | |
|---|---|---|
| IL | 125096/3 | 6/1998 |
| IL | 125097/3 | 6/1998 |
| JP | 10-327766 | 12/1998 |
| WO | 99/66876 | 12/1999 |
| WO | 99/66877 | 12/1999 |

*Primary Examiner*—Deborah D. Carr
(74) *Attorney, Agent, or Firm*—Synnestvedt & Lechner LLP

(57) ABSTRACT

Free-flowing unsaturated fatty acid calcium salts containing from about 0.1 to about 1.5 equivalents of calcium hydroxide relative to the fatty acid content, with the fatty acid content consisting essentially of (a) from about 40 to about 95% percent by weight of unsaturated C:16–C:22 fatty acids; (b) from about 5 to about 60% by weight of saturated C:14–C:22 fatty acids; and (c) no more than about 6% by weight of moisture, insolubles and unsaponifiables; with no more than about 20% by weight being in for form of glycerides;

wherein from about 40 to about 65% by weight of the total product weight consists of trans-C18:1 and C18:2 fatty acids; provided that when less than 0.75 equivalents of calcium hydroxide is present, the fatty acid content is at least 25% by weight saturated fatty acids.

3 Claims, No Drawings

RUMEN BYPASS CALCIUM SALTS OF C18:1 AND C18:2 FATTY ACIDS

BACKGROUND OF THE INVENTION

The present invention relates to calcium salts of unsaturated fatty acids that are of particular interest as nutritional supplements.

Unsaturated fatty acids undergo hydrogenation to saturated fatty acids by microbial action in the rumen and must be fed to ruminants in a protected form. U.S. Pat. No. 5,143,737 discloses the encapsulation of unsaturated fatty acids with non-toxic organic materials to protect the unsaturated fatty acids from microbial action in the rumen. The most familiar form in which fatty acids in general are protected from microbial action in the rumen are the fatty acid calcium salts disclosed by U.S. Pat. Nos. 4,642,317; 4,826,694; 4,853,233 and 4,909,138. This form of fatty acid protection is widely accepted in the dairy and beef cattle industries.

Unsaturated fatty acids, however, do not readily react to form calcium salts using the processes disclosed by the above-listed patents. Instead of forming free-flowing granules, a mass develops that hardens into a tough material that resists grinding into the fine particles required for consumption by cattle. The resulting material also lacks storage stability. The product tends to auto-oxidize through an exothermic reaction that leads to a congealing of the product mass horn its free flowing granular state to a hard amorphous state, suggesting that significant quantities of unreacted starting materials are present in the final product.

To be commercially viable, rumen-protected unsaturated fatty acid cattle feed supplements must be in a form acceptable to the cattle industry. Therefore, a need exists for unsaturated fatty acid calcium salts that are storage stable and easily formed into particles small enough for cattle to consume that also confer a nutritional benefit to the cattle.

SUMMARY OF THE INVENTION

This need is met by the present invention. It has been discovered that storage stable calcium salts of unsaturated fatty acids can be produced in fine particle form either by using elevated levels of calcium oxide, or by reducing the amount of unsaturated fatty acids in the fatty acid feedstock. The preparation of such fatty acids is disclosed in co-pending and commonly-owned U.S. Pat. No. 6,559,334, the disclosure of which is incorporated herein by reference.

It has further been discovered that cows fed a rumen-protected source of trans-C18:1 fatty acids will have decreased concentrations of milk fat, hepatic triacylglycerol, and lower incidence of sub-clinical ketosis during early postpartum, and that feeding a rumen-protected source of linoleic (C18:2) fatty acids during the transition period will increase synthesis of $PGF_{2\alpha}$. The linoleic fatty acids are will thus hasten uterine involution and reduce the incidence of clinical and subclinical uterine inflammation; which translates to increased fertility. The present invention combines both sources of fatty acids into one calcium salt feed supplement product that when fed to a lactating cow will achieve a better transition phase.

According to one aspect of the present invention, a free-flowing unsaturated fatty acid calcium salt product is provided containing from about 0.1 to about 1.5 equivalents of calcium hydroxide relative to the fatty acid content, with the fatty acid content consisting essentially of (a) from about 40 to about 95% percent by weight of unsaturated C:16–C:22 fatty acids; (b) from about 5 to about 60% by weight of saturated C:14–C:22 fatty acids; and (c) no more than about 6% by weight of moisture, insolubles and unsaponifiables; and with no more than about 20% by weight being in the form of glycerides;

wherein from about 40 to about 65% by weight of the total product weight consists of trans-C18:1 and C18:2 fatty acids; provided that when less than 0.75 equivalents of calcium hydroxide is present, the fatty acid content is least 25% by weight of saturated fatty acids.

In preferred products according to the present invention the ratio of trans-C18:1 and C18:2 is between about 60 and about 80% by weight of trans-C18:1 to between about 20 and about 40% by weight of C18:2.

The above and other features and advantages of the present invention will become clear from the following description of the preferred embodiment.

DETAILED DESCRIPTION OF THE PREFERRED EMBODIMENTS

The present invention employs a process by which highly unsaturated fatty acid feedstocks may be converted to free-flowing powder or granular fatty acid calcium salt rumen bypass feed supplements. The use of highly unsaturated fatty acid feedstocks represents a significant departure from conventional processes for the manufacture of fatty acid calcium salt feed supplements.

The process is employed as either a batch or a continuous process. In a typical process fatty acid feedstocks are added to a production vessel. The mixing should be accomplished in a kettle designed so that intensive and intimate contacting occurs between the calcium oxide and fat admixture so that a homogeneous dispersion of the calcium oxide particles results. Kettles may be either vertical or horizontal in configuration, and there is no need for jacketing for the purpose of heat input since the unit is operated adiabatically (no external heat input or output). The types of internal mixing elements span a wide gap but would include those with propeller, turbine, plows with chopper blades, or preferably 'Cowles-type' mixing blades as examples, but others may apply. These same devices are also be suitable for dispersing and homogenizing the water fraction into the fat admixture and calcium oxide.

Unsaturated fatty acid feedstocks are employed containing from about 40 to about 95% by weight of unsaturated C:16–C:22 fatty acids. The feedstocks should contain no more than about 6% by weight of moisture, insolubles and unsaponifiables and no more than about 20% by weight of the fatty acids should be in the form of glyceride. In general, unsaturated fatty acids having from 16–22 carbon atoms and from one to six double bonds are suitable for use with the present invention.

Essentially, any source of unsaturated fatty acids may be employed, inclusive of fatty acid sources of animal, vegetable or fish origin. This includes distillates and soap stocks of lard, tallow, vegetable oils such as canola oil, sunflower oil, safflower oil, rapeseed oil, soybean oil, olive oil, corn oil, and the like, and byproducts thereof, as well as fish oils and byproducts thereof Pre-treatment processes may be needed to reduce moisture, insolubles, unsaponifiables, and glycerides below about 10% by weight. The level of glycerides, which include monoglycerides, diglycerides and triglycerides, may be reduced by hydrolysis or saponification.

The unsaturated fatty acid feedstocks are selected on the basis of trans-C18:1 and C18:2 content. Fatty acid feedstocks high in trans-C18:1 content (about 50 weight percent and higher, and typically between about 50 and about 75 weight percent) are obtained from soybean oil. Fatty acid feedstocks high in C18:2 content (about 50 weight percent and higher, and typically between about 50 and about 75 weight percent) are obtained from safflower oil, although any appropriate source of either or both fatty acids may be used with the invention.

When the amount of calcium oxide falls below 1.75 equivalents relative to the amount of fatty acid, the amount of saturated fatty acids in the feedstock must be at a level of 25% by weight or greater. Feedstocks having less than 25% by weight of saturated fatty acids must be blended with another fatty acid feedstock having greater than 25% by weight of saturated fatty acids in an amount effective to produce at least 25% by weight of saturated fatty acids in the resulting admixture. A preferred source of saturated fatty acids is palm fatty acid distillate (PFAD). The fatty acid feedstock with higher levels of saturated fatty acids can be present in a blend at a level up to about 5 and about 60% by weight, and preferably between about 5 and about 30% by weight. Such blends can be reacted with greater than 1.75 equivalents of calcium oxide, although such calcium oxide levels are not necessary to produce a commercially acceptable product when saturated fatty acid levels exceed 25% by weight.

Saturated fatty acids have higher melting points than unsaturated fatty acids. Accordingly, it may be necessary to heat the unsaturated fatty acid feedstock to form a uniform, liquid admixture with the second fatty acid feedstock having a combined saturated fatty acid content of 25% by weight or greater. A temperature up to about 80° C. is suitable, with a temperature between about 50 and about 60° C. being preferred.

Calcium oxide is added to the fatty acid feedstock in the range of from about 1.0 to about 2.5 equivalents relative to the fatty acid feedstock. A calcium oxide level above about 1.4 equivalents is preferred, with about 1.75 equivalents being more preferred, so that highly unsaturated fatty acid feedstocks may be employed. A calcium oxide level between about 2.0 and 2.3 equivalents is most preferred.

Water is then added to hydrate the calcium oxide to its hydroxide form, creating a large amount of exothermic heat. The heat that is evolved is sufficient for the fatly acid neutralization reaction to proceed to completion, so that it is not necessary to supply heat to the reaction mixture from external sources from this point forward. Between about two and about five equivalents of water relative to the calcium oxide is added to the reaction mixture, with between about 2.5 and about 3.5 equivalents being preferred. Calcium hydroxide may be substituted for equivalent quantities of calcium oxide and water.

The excess water is converted to steam by the exothermic heat generated, which boils off rapidly. The reaction can be performed under atmospheric pressure, or under vacuum to draw off the steam.

The amount of time required for the reaction is typically between about 5 and about 60 minutes, and more typically between about 6 and about 10 minutes. The reaction is easily identified by the transformation of the admixture into a solid granular mass Upon further agitation, the mass further transforms into a free-flowing granular material, which, upon transfer from the reaction vessel, can easily be processed into free-flowing particles.

Products according to the present invention will contain from about 40 to about 65% by weight of trans-C18:1 and C18:2 fatty acids. Particularly preferred products have a total fatty acid content of about 85 weight percent. The trans-C18:1 and C18:2 fatly acids are present in a ratio between about 60 and about 80 weight percent trans-C18:1 to between about 20 and about 40 weight percent C18:2, with a ratio of between about 65 and about 75 weight percent trans-C18:1 to between about 25 and about 35 weight percent C18:2 being more preferred. A 70:30 weight ratio of trans-C18:1 to C18:2 is most preferred.

A biologically active material can be included as an optional ingredient in the invention process. By the term "biologically active material", it is meant any substance capable of being administered orally in a feed composition. Preferred biologically active materials are susceptible to inactivation in the rumen bimicrobes and digestive juices, and are thereby protected therefrom by incorporation into the fatty acid calcium salts of the present invention. The biologically active material can be selected from a broad variety of nutrients and medicaments, either as a single component or as a mixture of components, which are illustrated by the following list of active molecular species:

1. Sugars and complex carbohydrates which include both water-soluble and water insoluble monosacchandes, disaccharides and polysaccharides. Particularly preferred carbohydrates include cane molasses and sugar beet byproducts.

2. Amino acid ingredients, either singly or in combination, which include arginine, histidine, isoleucine, leucine, lysine, methionine, phenylalanine, threonine, tryptophan, valine, tyrosine ethyl HCl, alanine, aspartic acid, glutamic acid, sodium glutarnate, potassium glutamate, glycine, proline, serine, cystine ethyl HCl, and the like; and analogues and salts thereof.

3. Vitamin ingredients, either singly or in combination, including thiamine HCl, riboflavin, pyridoxine HCl, niacin, inositol, choline chloride, calcium pantothenate, biotin, folic acid, ascorbic acid, Vitamin B,Z, p-aminobenzoic acid, Vitamin A acetate, Vitamin K, Vitamin B, Vitamin E, and the like.

4. Trace element ingredients, either singly or in combination, including compounds of cobalt, copper, manganese, iron, zinc, tin, nickel, chromium, molybdenum, iodine, chlorine, silicon, vanadium, selenium, calcium, magnesium, sodium and potassium 5. Protein ingredients obtained from sources such as dried blood or meat meal, meat and bone meal, cottonseed meal, soybean meal, rapeseed meal, sunflower seed meal, canola meal, safflower meal, dehydrated alfalfa, corn gluten meal, soybean protein concentrate, potato protein, dried and sterilized animal and poultry manure, fish meal, fish and poultry protein isolates, crab protein concentrate, hydrolyzed protein feather meal, poultry byproduct meal, liquid or powdered egg, milk whey, egg albumen, cascin, fish solubles, cell cream, brewer's residues, and the like.

6. Medicament ingredients, either singly or in combination, including promazine hydrochloride, chloromedoniate acetate, chlorotetracycline, sulfamethazine, monensin, sodium monensin, poloxalme, oxytetracycline, BOVATEC, and the like.

7. Antioxidants, including butylated hydroxyanisole, butylated hydroxytoluene, tertiary butylhydroquinone, tocopherols, propyl gallate and ethoxyquin; and preservatives, including sodium sorbate, potassium sorbate, sodium benzoate, propionic acid, $\alpha$-hydroxybutenc acid, and the like.

The biologically active material is present at a level up to about 20% by weight relative to the fatty acid.

The unsaturated fatty acid calcium salt rumen bypass feed supplements of the present invention may be conveniently fed to a ruminant admixed with a conventional ruminant feed. The feeds are typically vegetable materials edible by ruminants, such as legume hay, grass hay, corn silage, grass silage, legume silage, corn grain, oats, barley, distiller's grain, brewer's grain, soya bean meal and cottonseed meal. There is no particular lower limit of the calcium salt to be added to the ruminant feed, although in practice, amounts of the calcium salt below about 1% of the dry solids content of the feed are too small to provide significant benefits.

The following non-limiting example illustrates certain aspects of the invention. All parts and percentages are by weight, and all temperatures are in degrees Celsius.

EXAMPLE 13.8 pounds of calcium oxide was added to a vertical mixer with Cowles-type mixing blades containing 78.2 pounds of a mixture of soybean oil (hydrogenated to provide a transC18:1 content of 60 weight percent) blended with safflower oil. The respective amounts of the two oils were selected to provide 60 percent total product weight of trans-C18:1 and C18:2 in a 70:30 ratio of trans-C18:1 to C18:2. The oils had by concentration 95% by weight free fatty acid. The total unsaturated fatty acid content was 90% by weight. Prior to adding the calcium oxide, the oil blend was heated to a temperature of 60° C. After the calcium oxide was uniformly dispersed, 10.8 pounds of water was added, and the temperature of the mixture rose to 120° C. Agitation continued until a uniform, homogenous mixture was obtained, which was dumped from the vessel into a tray, in which the reaction went to completion and the product cooled. Milling of the finished product produced a free-flowing granule that was not dusty having a total fat content of about 83% by weight.

The present invention thus provides a method by which rumen-protected fatty acid calcium salts high in trans-C18:1 and C18:2 content may be prepared in a form familiar to and accepted by the dairy and cattle industry for supplementation of cattle diets to improve cow fertility. The foregoing examples and description of the preferred embodiment should be taken as illustrating, rather than as limiting, the present invention as defined by the claims. As will be readily appreciated, numerous variations, and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A free-flowing unsaturated fatty acid calcium salt comprising from about 0.1 to about 1.5 equivalents of calcium hydroxide relative to the fatty acid content, said fatty acid content consisting essentially of:
   (a) from about 40 to about 95% percent by weight of unsaturated C:16–C:22 fatty acids; (b) from about 5 to about 60% by weight of saturated C:14–C:22 fatty acids; and (c) no more than about 6% by weight of moisture, insolubles and unsaponifiables; with no more than about 20% by weight being in the form of glycerides;
   wherein from about 40 to about 65% by weight of the total product weight consists of trans-C18:1 and C18:2 fatty acids; provided that when less than 0.75 equivalents of calcium hydroxide is present, said fatty acid content is at least 25% by weight saturated fatty acids.

2. The fatty acid calcium salt of claim 1, wherein the ratio of trans-C18:1 and C18:2 fatty acids is between about 60 and about 80% by weight of trans-C18:1 fatty acids to between about 20 and about 40% by weight of C18:2 fatty acids.

3. The fatty acid calcium salt of claim 2, wherein the ratio of trans-C18:1 and C18:2 fatty acids is between about 65 and about 75% by weight of trans-C18:1 fatty acids to between about 25 and about 35% by weight of C18:2 fatty acids.

* * * * *